United States Patent [19]
Newkirk et al.

[11] Patent Number: 5,017,526
[45] Date of Patent: May 21, 1991

[54] METHODS OF MAKING SHAPED CERAMIC COMPOSITES

[75] Inventors: Marc S. Newkirk, Newark, Del.; Shirley L. Zwicker, Elkton, Md.

[73] Assignee: Lanxide Technology Company, LP, Newark, Del.

[21] Appl. No.: 338,471

[22] Filed: Apr. 14, 1989

Related U.S. Application Data

[63] Continuation of Ser. No. 861,025, May 8, 1986, abandoned.

[51] Int. Cl.$^5$ ............................................. C04B 35/10
[52] U.S. Cl. .................................... 501/89; 501/95; 501/96; 501/119; 501/127; 501/128; 264/65; 428/367
[58] Field of Search ............... 501/95, 87, 88, 92, 501/94, 96, 98, 119, 127, 128, 134; 423/345, 411, 412, 618, 625; 75/235; 264/65; 428/367

[56] References Cited

U.S. PATENT DOCUMENTS

| | | | |
|---|---|---|---|
| 1,362,237 | 12/1920 | Ros | 423/618 OR |
| 2,741,822 | 4/1956 | Udy | 25/157 |
| 3,108,887 | 10/1963 | Lonie | 501/98 X |
| 3,255,027 | 6/1966 | Talsma | 264/65 |
| 3,262,763 | 7/1966 | Bechtold | 501/98 X |
| 3,296,002 | 1/1967 | Hare | 106/40 |
| 3,298,842 | 1/1967 | Seufert | 501/127 |
| 3,419,404 | 12/1968 | Mao | 501/98 X |
| 3,421,863 | 1/1969 | Bawa | 501/128 |
| 3,437,468 | 4/1967 | Seufert | 74/235 |
| 3,473,938 | 10/1969 | Oberlin | 264/65 |
| 3,473,987 | 10/1969 | Sowards | 501/119 |
| 3,538,231 | 11/1970 | Newkirk et al. | 13/25 |
| 3,551,101 | 12/1970 | Matsuo | 423/412 OR |
| 3,692,474 | 9/1972 | Arber | 423/411 X |
| 3,789,096 | 1/1974 | Church | 264/60 |
| 3,864,154 | 2/1975 | Gazza et al. | 29/123 B |
| 3,973,977 | 8/1976 | Wilson | 501/120 |
| 4,117,096 | 9/1978 | Hosaka et al. | 501/88 X |
| 4,713,360 | 12/1987 | Newkirk et al. | 501/128 X |
| 4,822,759 | 4/1989 | Newkirk et al. | 501/127 X |
| 4,851,375 | 7/1989 | Newkirk et al. | 501/127 X |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0127208 | 7/1985 | Japan ................... 423/412 |
| 1011527 | 4/1983 | U.S.S.R. ............... 423/618 |
| 0896766 | 5/1962 | United Kingdom ....... 423/412 |
| 2127709 | 4/1984 | United Kingdom ....... 423/412 |

OTHER PUBLICATIONS

Drouzy et al, "Oxidation of Molten Aluminum Alloys", Reaction with Refractories, France, vol. 29, No. 332, pp. 121-128 Mar. 1974.

Clavand et al, "Refractories for Aluminum Alloy Melting Furnaces", Sep. 25 & 26, 1980.

Moskovits, "The Kinetics of Oxidation of Molten Aluminum in Oxidation Systems", Oxidation of Metals, vol. 5, No. 1, (1972).

*Primary Examiner*—Karl Group
*Attorney, Agent, or Firm*—Mark G. Mortenson; William E. McShane

[57] ABSTRACT

A method of producing self-supporting ceramic composite bodies of desired shape by infiltrating a permeable self supporting preform with polycrystalline matrix material comprising an oxidation reaction product obtained by oxidation of a parent metal precursor, such as aluminum, and optionally containing therein metallic constituents. The composite body is formed by contacting a zone of a permeable self supporting preform, having at least one defined surface boundary spaced from said contacting zone, with a body of molten metal which is reacted with a suitable vapor-phase oxidant to form an oxidation reaction product. Within a certain temperature region, and optionally with one or more dopants in or on the parent metal or said permeable preform, molten parent metal migrates through previously formed oxidation reaction product into contact with the oxidant, causing the oxidation reaction product to grow into the preform toward said defined surface boundary so as to infiltrate the preform up to said defined surface boundary with the oxidation reaction product, and providing the composite structure of desired geometry.

33 Claims, 4 Drawing Sheets

METHODS OF MAKING SHAPED CERAMIC COMPOSITES

This is a continuation of co-pending application Ser. No. 0/861,025 filed on May 8, 1986.

BACKGROUND OF THE INVENTION

1. This invention relates broadly to shaped, self-supporting ceramic composites and to methods for producing the same. More particularly, this invention relates to shaped, self-supporting ceramic composites comprising a shaped preform infiltrated by a ceramic matrix; and to methods of making novel ceramic composites by infiltrating a shaped preform with a ceramic matrix by "growing" an oxidation reaction product from a parent metal precursor, which product embeds constituents of said preform thereby forming a composite having the geometry of said preform.

2. Description of Commonly Owned Patent Applications

The subject matter of this application is related to commonly owned and copending U.S. patent application Ser. No. 819,397, filed Jan. 17, 1986, now U.S. Pat. No. 4,851,375, which is a continuation-in-part of U.S. patent application Ser. No. 697,876, filed Feb. 4, 1985, now abandoned, both in the names of Marc S. Newkirk et al and both entitled "Composite Ceramic Articles and Methods of Making Same." These applications disclose a novel method for producing a self-supporting ceramic composite by growing an oxidation reaction product from a parent metal into a permeable mass of filler. The resulting composite, however, has no defined or predetermined geometry, shape, or configuration.

The method of growing a ceramic oxidation reaction product is disclosed generically in commonly owned U.S. Pat. No. 4,713,360 which issued on Dec. 15, 1987 and was based on change U.S. application Ser. No. 818,943, filed Jan. 15, 1986, which was a continuation-in-part of Ser. No. 776,964, filed Sept. 17, 1985, now abandoned which wa a continuation-in-part of Ser. No. 705,787, filed Feb. 26, 1985, now abandoned which was a continuation-in-part of Ser. No. 591,392, filed Mar. 16, 1984, now abandoned, all in the names of Marc S. Newkirk et al and entitled "Novel Ceramic Materials and Methods of Making the Same. This method of using an oxidation phenomenon, which may be enhanced by the use of an alloyed dopant, affords self-supporting ceramic bodies grown as the oxidation reaction product from a precursor metal. This method was improved upon by the use of dopants applied to the surface of the precursor metal as disclosed in commonly owned U.S. application Ser. No. 822,999, filed Jan. 27, 1986, which is a continuation-in-part of Ser. No. 776,965, filled Sept. 17, 1985, now abandoned, which is a continuation-in-part of Ser. NO. 747,788, filed June 25, 1985, now abandoned which is a continuation-in-part of Ser. No. 632,636, filed July 20, 1984, now abandoned entitled "Methods of Making Self-Supporting Ceramic Materials," all in the names of Marc S. Newkirk et al. The entire disclosures of all of the foregoing Commonly Owned Patent Applications and patent are expressly incorporated herein by reference. It should be noted that U.S. application Ser. No. 822,999, was abandoned in favor of a Rule 62 Continuation Application (filed June 23, 1988; U.S. Ser. No. 220,935 now U.S. Pat. No. 4,853,352).

3. Description of the Prior Art

In recent years, there has been an increasing interest in the use of ceramics for structural applications historically served by metals. The impetus for this intersect has been the superiority of ceramics with respect to certain properties, such as corrosion resistance, hardness, modulus of elasticity, and refractory capabilities when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which encloses one or more diverse kinds of filler materials such as particulates, fibers, rods or the like, The traditional methods of preparing ceramic articles involve the following general steps: (1) preparation of ceramic material in powder form; (2) grinding or milling of powders to obtain very fine particles; (3) formation of the powders into a body having the desired geometry (with allowance for shrinkage during subsequent processing), for example by uniaxial pressing, isostatic pressing, injection molding, tape casting, slip casting or any of several other techniques; (4) densification of the body by heating it to an elevated temperature such that the individual powder particles merge together to form a coherent structure, preferably accomplished without the application of pressure (i.e., by pressureless sintering), but in some cases an additional driving force is required and can be provided through the application of external pressure either uniaxially (i.e., hot pressing) or isostatically (i.e., hot isostatic pressing); and (5) finishing, frequently by diamond grinding, is required.

When these traditional methods are applied to the preparation of ceramic matrix composite materials, additional difficulties arise. Perhaps the most serious problems concern the densification step, number (4) above. The normally preferred method, pressureless sintering, can be difficult or impossible in preparing particulate composites if the materials are to highly compatible. More importantly, conventional sintering is impossible in most cases involving fiber composites even when the materials are compatible, because the merging together of the particles is inhibited by the fibers which tend to prevent the necessary displacement of the densifying powder particles. These difficulties have been, in some cases, partially overcome by forcing the densification process through the application of external pressure at high temperature. However, such procedures can generate many problems, including breaking or damaging of the reinforcing fibers by the external forces applied, limited capability to produce complex shapes (especially in the case of uniaxial hot pressing), and generally high costs resulting from low process productivity and the extensive finishing operations sometimes required.

Additional difficulties also can arise in the blending of powders with whiskers or fibers, and in the body formation step, number (3) above, where it is important to maintain a uniform distribution of the composite second phase within the matrix. For example, in the preparation of a whisker-reinforced ceramic composite, the powder and whisker flow processes involved in the mixing procedure, and in the formation of the body, can resulting non-uniformities and undesired orientations of the reinforcing whiskers, with a consequent loss of performance characteristics.

A method for producing metal oxide refractories by the oxidation/reduction ("redox") reaction of a metal with silica is disclosed in U.S. Pat. No. 2,702,750. According to this patent, a silica body is either submerged into a molten bath of a metal such as aluminum, or a metal powder is dispersed throughout the silica body and then heated. Where desired, an inert material, such as alumina, may be added to the body. The refractory product is produced by oxidizing the metal to its oxide while reducing the silica to liberate silicon. In U.S. Pat. No. 3,973,977, there is disclosed a method of making a cermet composed overwhelmingly of magnesium aluminate spinel by immersing an agglomerate of several oxides into a bath of molten aluminum. Neither of these two patents discloses the directional growth of an oxidation reaction product formed by oxidation of a metal precursor with a vapor-phase oxidant, nor do they disclose such growth and infiltration into a shape preform.

The Commonly Owned Patent Applications describe new processes which resolve some of these problems of traditional ceramic technology as described more fully therein. The present invention combines these processes with additional novel concepts to remove a further limitation of ceramic technology, namely, the formation of complex structures to net or near net shape. More particularly, the present invention provides for the formation of composite shapes having a relatively complicated geometry or configuration, for example, with contoured planes or surfaces and with bores or openings. Further, the present invention provides for fabrication of ceramic composites of certain predetermined geometry by an unusual oxidation phenomenon which overcomes the difficulties and limitations associated with known processes. This method provides shaped ceramic articles as one-piece bodies having a predetermined shape, and of a size and thickness which are difficult or impossible to duplicate with the presently available technology.

SUMMARY OF THE INVENTION

The present invention broadly provides a method for producing a self-supporting ceramic composite body of a predetermined shape comprising a preform infiltrated by a ceramic matrix. The ceramic matrix is obtained primarily by the oxidation reaction of a parent metal precurose with a vapor-phase oxidant to form a polycrystalline material, which infiltrates the preform, and consists essentially of the resulting oxidation reaction product and, optionally, one or more metallic constituents. The vapor-phase oxidant may be sued in conjunction with either a solid oxidant or a liquid oxidant, as explained below in greater detail, and in such a case the polycrystalline matrix may include the reaction product of the metal precursor with such additional oxidants and oxidized or reduced constituents of such oxidants. The resulting self-supporting composite has the configuration or geometry substantially that of the preform. The process of the present invention provides net or near net shapes which minimizes or eliminates the need for further shaping or finishing, e.g. by grinding. Also, the products exhibit such desirable characteristics as straightness, concentricity and general design fidelity.

In accordance with the method of the present invention, the ceramic composite is produced by forming at least one permeable preform of a desired, predetermined shape and having at least one defined surface boundary. The preform is permeable to the vapor-phase oxidant and to infiltration by the developing oxidation reaction product. The parent metal is heated to a temperature above its melting point but below the melting point of the oxidation reaction product to form a body of molten metal, but it should be understood that the operable temperature range or preferred temperatures may not extend over this entire temperature interval. The body of molten metal is contacted with a zone of the permeable preform, as by positioning the metal adjacent the preform and in a direction towards the defined surface boundary. At this temperature, or within the temperature range, the molten metal reactants with the oxidant to form a layer of oxidation reaction product. Upon continued exposure to the oxidizing environment, and with at least a portion of the oxidation reaction product maintained in contact with and between the body of molten metal and the oxidant, molten metal is progressively drawn through the oxidation reaction product towards the oxidant. In this manner, the oxidation reaction product continues to form at the interface between the oxidant and previously formed oxidation reaction product that has infiltrated the preform. The reaction is continues until the polycrystalline oxidation reaction product has infiltrated the preform to the defined surface boundary, and thus the resulting polycrystalline matrix has embedded the constituents of the preforming order to produce the ceramic composite having the configuration or geometry of the preform.

In another aspect of the invention, there is provided a self-supporting ceramic composite body having the configuration or geometry substantially that of a shaped preform infiltrated by a ceramic matrix formed upon oxidation of parent metal precursor, as described below in greater detail.

The materials of this invention can be grown with substantially uniform properties throughout their cross-section to a thickness heretofore difficult to achieve by conventional processes for producing dense ceramic structures. The process which yields these materials also obviates the high costs associated with conventional ceramic product methods, including fine, high purity, uniform powder preparation, green body forming, binder burnout, and densification by sintering, hot pressing and/or hot isostatic pressing.

The products of the present invention are adaptable or fabricated for use as articles of commerce which, as used therein, is intended to include, without limitation, industrial, structural and technical ceramic bodies for such applications where electrical, wear, thermal, structural, or other features or properties are important or beneficial; and is not intended to include recycle or waste material as such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composite or dominant properties, although the body may contain minor or substantial amounts of one or more metallic constituents derived from the parent metal or produced from the oxidant or by dopant, most typically within a range of from about 1-40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of the reaction of one or more metals with an oxidant.

"Oxidant" means one or more suitable electron acceptors or electron sharers and may be an element, a combination of elements, a compound, or a combination of compounds, including reducible compounds, and is vapor, solid or liquid a the process conditions.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

DETAILED DESCRIPTION OF THE INVENTION AND PREFERRED EMBODIMENTS

Figure 1:
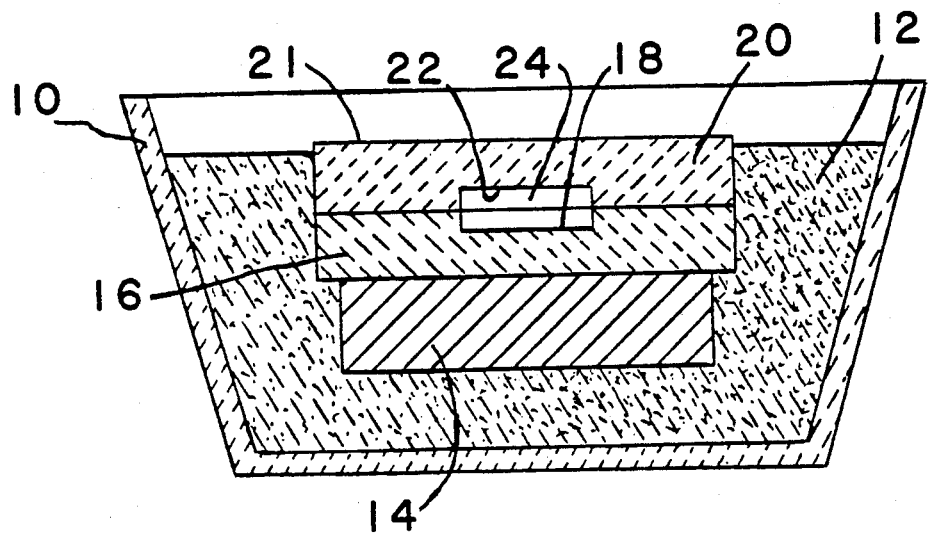
FIG. 1 is a cross-sectional view showing a parent metal ingot overlaid by an assembly of two preforms forming a rectangular aperture, with the preform assembly and the metal positioned in an inert bed contained in a crucible, in order to form a complex composite by the method of this invention.

In accordance with the present invention, the parent metal, which may be doped (as explained below in greater detail) and is the precursor to the oxidation reaction product, is formed into an ingot, billet, rod, plate, or the like, and placed in an inert bed, crucible or other refractory container. A permeable, shaped preform (described below in greater detail) is manufactured such as to have at least one defined surface boundary and to be permeable to the vapor-phase oxidant and to the infiltrating oxidation reaction product. The preform is placed adjacent to and preferably in contact with one or more surfaces of, or a portion of a surface of, the parent metal such that at least a portion of the defined surface boundary of the preform is generally positioned distantly or outwardly or spaced from the metal surface of the parent metal. The preform preferably is in contact with an real surface of the parent metal; but when desired, the preform may be partially immersed, but not totally immersed, in the molten metal because complete immersion would cut off or block access of the vapor-phase oxidant into the preform for proper development of the polycrystalline matrix. Formation of the oxidation reaction product will occur in a direction towards the defined surface boundary. This set-up of parent metal and permeable preform in a suitable container is placed in a furnace, and the environment is supplied with a vapor-phase oxidant and heated to process conditions.

The preform useful in the practice of the invention should be sufficiently porous or permeable to allow the vapor-phase oxidant to permeate the preform and contact the parent metal. The preform also should be sufficiently permeable to accommodate the development or growth of the oxidation reaction product as a matrix within the preform without substantially disturbing, upsetting, or otherwise altering the configuration or geometry of the preform.

The vapor-phase oxidant is normally gaseous, or vaporized at the process conditions, which provides an oxidizing atmosphere such as atmospheric air. Typical vapor oxidants include, for example, elements or compounds of the following, or combinations of elements or compounds of the following, including volatile or vaporizable elements, compounds, or constituents of compounds or mixtures: oxygen, nitrogen, a halogen, sulphur, phosphorus, arsenic, carbon, boron, selenium, tellurium, methane, ethane, propane, acetylene, ethylene, propylene (the hydrocarbons as a source of carbon), and mixtures such as air, $H_2/H_2O$ and $CO/CO_2$, the latter two (i.e., $H_2/H_2O$ and $CO/CO_2$) being useful in reducing the oxygen activity of the environment relative to desirable oxidizable constituents of the preform. Oxygen or gas mixtures containing oxygen (including air) are suitable vapor-phase oxidants, with air usually being preferred for obvious reasons of economy. When a vapor-phase oxidant is identified as containing or comprising a particular gas or vapor, this means a vapor-phase oxidant in which the identified as or vapor is the sole, predominant or at least a significant oxidizer of the parent metal under the conditions obtained in the oxidizing environment utilized. For example, although the major constituent of air is nitrogen, the oxygen content of air is normally the sole oxidizer of the present metal under the conditions obtained in the oxidizing environment utilized. Air therefore falls within the definition of a "nitrogen-containing gas" oxidant. An example of a "nitrogen-containing gas" oxidant as used herein and in the claims is "forming gas", which typically contains about 96 volume percent nitrogen and about 4 volume percent hydrogen.

An oxidant which is liquid or solid at the process conditions may be employed in conjunction with the vapor-phase oxidant. Such additional oxidants may be particularly useful in enhancing oxidation of the parent metal preferentially within the preform, rather than beyond its surface. That is, the use of such additional oxidants may create an environment within the preform more favorable to the oxidation kinetics of the parent metal than the environment outside the preform. This enhanced environment is beneficial in promoting matrix development within the preform to the boundary and minimizing overgrowth. When a solid oxidant is employed, it may be dispersed through the entire preform or through a portion of the preform adjacent the parent metal, such as in particulate form and admixed with the preform, or it may be utilized as coatings on the preform particles. Any suitable solid oxidant may be employed depending upon its compatibility with the vapor-phase oxidant. Such solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire preform or a portion thereof adjacent to the molten metal, provided such liquid oxidant does not prevent access of the vapor-phase oxidant to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat part or all of the porous surfaces of the preform and which is melted or decomposed at the process conditions to provide a suitable oxidant moiety. Examples of liquid oxidants as herein defined include low melting glasses.

The lay-up, comprising the parent metal and permeable preform, is placed in a furnace that is supplied with a vapor-phase oxidant, and the lay-up is heated to or within a temperature region above the melting point of the parent metal but below the melting point of the oxidation reaction product. For example, in the case of an aluminum parent metal using air as the vapor-phase oxidant, the temperature is generally between about 850–1450° C. and more preferably between about 900–1350° C. Within this operable temperature interval or preferred temperature range, a body or pool of molten metal forms, and on contact with the oxidant(s), the molten metal will react to form a layer of oxidation reaction product. Upon continued exposure to the oxidizing environment, within an appropriate temperature region, the remaining molten metal is progressively drawn into and through the oxidation reaction product in the direction of the oxidant. On contact with the oxidant, the molten metal will react to form additional oxidation product. At least a portion of the oxidation reaction product is maintained in contact with and between the molten parent metal and the vapor-phase oxidant to sustain the continued growth of the polycrystalline oxidation reaction product in the preform. The polycrystalline reaction product will continue to grow and develop within the preform, embedding its constituents, generally if there is provided an interchange of vapor-phase oxidant, and additional parent metal is present. When the vapor-phase oxidant is air this interchange is effected most conveniently by providing venting means within the furnace.

The process is continued until the oxidation reaction product has embedded the constituents of the preform to the defined surface boundary, and desirably not beyond, which would be an "over-grow" by the polycrystalline matrix material. The resulting ceramic composite product includes a perform infiltrated to its boundaries by a ceramic matrix comprising a polycrystalline material consisting essentially of the oxidation reaction product of the parent metal with the vapor-phase oxidant and, optionally, one or more metallic constituents such as non-oxidized c constituents of the parent metal or metallic constituents of a reducible oxidant. Most typically, the boundaries of the preform and of the polycrystalline matrix substantially coincide; but individual constituents at the surfaces of the preform may be exposed or may protrude from the matrix, and therefore infiltration and embodiment may be completely surround or encapsulate the preform by the matrix. It further should be understood that the resulting polycrystalline matrix may exhibit porosity which may be a partial or nearly complete replacement of the metal phase, but the volume percent of voids will depend largely on such conditions as temperature, time, type of parent metal, and dopant concentrations. Typically in these polycrystalline ceramic structures, the oxidation reaction product crystallites are interconnected in more than one dimension, preferably in three dimension, and the metal phase or pore phase may be at least partially interconnected. The ceramic composite product of this invention has generally well-defined boundaries and possesses the dimensions and geometric configuration of the original preform.

Although the present invention is hereinafter described with particular emphasis on aluminum and specific embodiments of aluminum as the parent metal, this referenced is for exemplary purposes only, and it is to be understood that other metals such as silicon, titanium, tin, zirconium, etc., also can be employed which satisfy, or can be doped to satisfy, the criteria of the invention. Examples of materials useful in fabricating a preform in practicing the present invention, depending upon the parent metal and oxidation system chosen, may include one more of aluminum oxide, silicon carbide, silicon aluminum oxynitride, zirconium oxide, zirconium boride, titanium nitride, barium titanate, boron nitride, silicon nitride, various ferrous alloys, e.g., an iron-chromium-aluminum alloy, carbon, aluminum, various clays, and mixtures thereof. However, any suitable material may be employed in the preform. For example, if aluminum is employed as the parent metal, and aluminum nitride is the intended oxidation reaction product, aluminum nitride and/or aluminum oxide particles would be suitable materials for the preform; if zirconium is employed as a parent metal, and zirconium nitride is the intended oxidation reaction product, zirconium boride particles would comprise a suitable composition for a preform; if titanium is employed as a parent metal and titanium nitride is the intended oxidation reaction product, a preform comprised of alumina and/or titanium diboride particles would be suitable; if tin is employed as a parent metal, and tin oxide is the intended oxidation reaction product, a preform comprised of alumina particles would be suitable or if silicon is employed as the parent metal and silicon nitride is the intended oxidation reaction product, a preform comprised of titanium nitride particles would be suitable.

The permeable preform of this invention may be created or formed into any predetermined or desired size and shape by any conventional method, such as slip casting, injection molding, transfer molding, vacuum forming, or otherwise, by processing any suitable material(s), which is be more specifically identified and described hereafter. The permeable preform, as was previously mentioned, may include or have incorporated therein a solid oxidant and or a liquid oxidant which may be used in conjunction with the vapor-phase oxidant. The preform should be manufactured with at leas tone surface boundary, and should retain sufficient shape integrity and green strength to provide dimensional fidelity prior to being infiltrated by the ceramic matrix. The permeable preform, however, should be permeable enough to accommodate the growing polycrystalline matrix. Preferably, the preforms of this invention have a porosity of between about 5 and 90% by volume, and more preferably between about 25 and 50%. The porous preform preferably should be capable of being wetted by the molten parent metal under process temperature. conditions in order to encourage development of the polycrystalline matrix within the preform to produce a ceramic composite product of high integrity and well-defined borders.

The preform, being of any size or shape, has at least one surface boundary which essentially defines the destination or boundary for the growing polycrystalline matrix. By way of example only, the preform may be hemispherical in shape with the flat surface boundary in contact with the parent metal surface boundary to which the polycrystalline material is to grow; or the preform may be cubical in shape with one square surface boundary contacting the metal surface of the parent metal and the remaining five square surface boundaries being the objective points for the growing polycrystalline material. A matrix of the polycrystalline material resulting from the oxidation reaction is grown into the permeable preform so as to infiltrate and embed the constituents of the latter to its defined surface bondary without substantially disturbing or displacing it. Thus, no external forces are involved which might damage the preform, little or no shrinkage is involved which might crack the preform and cause it to loss fidelity with respect to its original shape and tolerance, and no awkward and costly high temperature, high pressure processes and facilities and required to achieve a composite ceramic product. In addition, the special requirements of chemical and physical compatibility necessary for pressureless sintering of particulate composites are avoided by the present invention.

The permeable preform of this invention may be composed of any suitable material, such as ceramic and/or metal particulates, powders fibers, whickers, wires, particles, hollow bodies or spheres, wire or refractory cloth, solid spheres, etc., and combinations thereof. The preform materials typically comprises a bonded array or arrangement, which array has interstices, openings, intervening spaces, or the like to render the preform permeable to the oxidant and the infiltration of the oxidation reaction product growth without altering the configuration of the preform. The preform may include a lattice of reinforcing rods, bars, tubes, tubules, plates, wires, spheres or other particulates, platelets, wire cloth, ceramic refractory cloth or the like, or a combination of any of the foregoing, prearranged in a desired shape. Further, the material(s) of the preform may be homogeneous or heterogeneous. The suitable materials of the preform, such as ceramic powders or particulate, may be bonded together with any suitable binding agent, e.g. polyvinyl alcohol or the like, which does not interfere with the reactions of this invention, or leave undesirable residual by-products within the ceramic composite product. Suitable particulates, such as silicon carbide or alumina, having a grit or mesh size of from about 10 to 1000 or finer, or an admixture of mesh sizes and types, for example, may be used. The particulate may be molded by known or conventional techniques as by forming a slurry of the particulate in an organic binder, pouring the slurry into a mold, and then letting the part set as by drying at an elevated temperature.

More specifically, with respect to suitable materials that may be employed in the formation and manufacture of the permeable preform, three classes of materials may be identified as suitable materials for the permeable preform.

The first class of preform materials includes those chemical species which, under the temperature and oxidizing conditions of the process, are not volatiles, are thermodynamically stable and do not react with or dissolve excessively in the molten parent metal. Numerous materials are known to those skilled to the art as meet in such criteria in the case where aluminum as the metal and air or oxygen as the oxidant, for example, are employed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgOAl_2O_3$, re contained in this class of stable refractory compounds.

A second class of suitable materials for the preform are those which are not intrinsically table in the oxidizing and high temperature environment, but which, due to the relatively slow kinetics of the degradation reactions, can act and/or perform as the preform phase when infiltrated by the growing polycrystalline ceramic matrix. A particularly useful material for this invention is silicon carbide. This material would oxidize completely under the conditions necessary to oxidize aluminum with oxygen or air in accordance with the invention were it not for a protective layer of silicon oxide forming and covering the silicon carbide particles to limit further oxidation of the silicon carbide.

A third class of suitable materials for the preform of this invention are those which are not, on thermodynamic or on kinetic grounds, expected to survive the oxidizing environment or the exposure to molten metal necessary for the practice of the invention. Such a preform can be made compatible with the process of the present invention if (1) the environment is made less active, for example, through the use of $H_2/H_2O$ or $CO/CO_2$ mixtures as the oxidizing gas, or (2) through the application of a coating thereto, such as aluminum oxide, which makes the species kinetically non-reactive in the process environment. An example of such a class of preform materials would be carbon fiber employed in conjunction with a molten aluminum parent metal. If the aluminum is to be oxidized with air or oxygen at, for example, 1250° C., to generate a matrix incorporating a preform containing said fibers, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant and optionally employing a $CO/CO_2$ atmosphere as oxidant which tends to be oxidizing to the aluminum but no the contained carbon fibers, The preform of this invention maybe employed as a single preform or as an assemblage of preforms to form more complex shapes. It has been discovered that the polycrystalline matrix can grow through adjacent, contacting portions of a preform assemblage, and bond continuous preforms at their contact surfaces into a unified or integral ceramic composite. The assembly of preforms is arranged so that the direction of growth of the oxidation reaction product will be towards and into the assembly of preforms to infiltrate and embed the assembly to the boundaries defined by the assembled preforms. Thus, complex ceramic composites can be formed as an integral body which cannot otherwise be produced by conventional manufacturing techniques. It should be understood that whenever the form "preform" is used herein and in the claims, it means a single preform or an assemblage of preforms, unless otherwise stated.

By way of example only of such an assemblage or preforms, FIG. 1 is a vertical cross-sectional view of a crucible 10 containing an inert bed 12 which includes a parent metal 14 overlaid by an assemblage of preforms comprising preform 16 with recess 18, and preform 20 having a top surface boundary 21 and a recess 22. Preform 20 is superimposed onto preform 16 such that the borders or marginal edges of the recesses 18 and 22 register, and the recesses 18 and 22 complement each other and define a rectangular aperture 24. The surfaces of recesses 18 and 22 may be provided with a barrier means, e.g. Plaster of Paris, as described and claimed in copending U.S. application Ser. No. 861,024, filed on May 8, 1986, now U.S. Pat. No. 4,923,832, entitled "Method of Making Shaped Ceramic Composites with the Use of a Barrier," in the names of Newkirk et al, and assigned to the same owner, for inhibiting a growth of the oxidation reaction product beyond the surfaces of the preform and within aperture 24. As explained above, the polycrystalline matrix is grown to infiltrate the assemblage of preforms 16 and 20 to the top surface boundary 21 of preform 20 such as to bond or unify preforms 16 and 20 and produce a ceramic composite having the rectangular aperture 24.

In producing a net or near net shape ceramic composite body which retains essentially the origin shape and dimensions of the preform, growth of the ceramic matrix would occur to the at least one defined surface boundary of the preform. Growth beyond the surface boundaries can be prevented, inhibited or controlled by any one or combination of the following steps: (1) creating conditions within the preform, for example, by incorporating solid or liquid oxidants in the preform such that internal growth is highly preferred to growth beyond the preform surfaces; (2) using a substantially exact, predetermined quantity of parent metal such that when it is entirely consumed or converted into the polycrystalline structure, the oxidation reaction product is at the boundary of the permeable preform; (3) controlling or limiting the amount of oxidants available to the process initially; (4) providing a barrier means on the preform surface(s) as described in the copending U.S. application Ser. No. 861,024, now U.S. Pat. No. 4,923,832, mentioned above; or (5) at the appropriate time, stopping the process by evacuating, or eliminating , the oxidizing atmosphere or by altering the reaction temperature to be outside the process temperature envelope, e.g. lowered below the melting point of the parent metal. Usually, the temperature is reduced by lower the furnace temperature, and then the material is removed from the furnace. Step (5) may require vigilance to avoid matrix overgrowth of any defined surface boundary.

The ceramic composite product obtained by the practice of the present invention will usually be a dense coherent product wherein between about 5% and about 98% by volume of the total volume of the ceramic composite product is comprised of one or more of the preform materials embedded within a polycrystalline ceramic matrix. The polycrystalline ceramic matrix is usually comprised of, when the parent metal is aluminum and air or oxygen is the oxidant, about 60% to about 99% by weight (of the weight of polycrystalline matrix) of interconnected α-alumina oxide and about 1% to 40% by weight (same basis) of nonoxidized metallic constituents.

As a further embodiment of the invention as explained in the Commonly Owned Patent Applications, the addition of dopant materials in conjunction with the metal can favorably influence the oxidation reaction process. The function or functions of the dopant material itself. These factors include, for example, the particular parent metal, the end product desired, the particular combination of dopants when two or more dopants are used, the use of an eternally applied dopant in combination with an alloyed dopant, the concentration of the dopant, the oxidizing environment, and the process conditions.

The dopant or dopants used in conjunction with the parent metal (1) may be provided as alloying constituents of the parent metal, (2) may be applied to at least a portion for the surface of the parent metal, or (3) may be applied to or incorporated into the preform or a part of the preform, or any combination of two or more of techniques (1), (2) and (3) may be employed. For example, an alloyed dopant may be used in combination with an externally applied dopant. In the case of technique (3), where a dopant or dopants are applied to the preform, the application may be accomplished in any suitable manner, such as by dispersing the dopants throughout part or the entire mass of the preform as coatings or in particulate form, preferably including at least a portion of the preform adjacent the parent metal. Application of any of the dopants to the preform may also be accomplished by applying a layer of one or more dopant materials to and within the preform, including any of its internal openings, interstices, passageways, intervening spaces, or the like, that render it permeable. A convenient manner of applying any of the dopant material is to merely soak the entire bed in a liquid (e.g., a solution) of dopant material or its precursor. A source of the dopant may also be provided by placing a rigid body of dopant in contact with and between at least a portion of the parent metal surface and the preform. For example, a thin sheet of silicon-containing glass (useful as a dopant for the oxidation of an aluminum parent metal) can be placed open a surface of the parent metal. When the aluminum parent metal (which may be internally doped with Mg), overlaid with the silicon-containing material, is melted in an oxidizing environment (e.g., in the case of aluminum in air, between about 850° C. to about 1450° C., preferably about 900° C. to about 1350° C.), growth of the polycrystalline ceramic matrix into the permeable preform occurs. In the case where the dopant is externally applied to at lest a portion of the surface of the parent metal, the polycrystalline oxide structure generally grows within the permeable preform substantially beyond the dopant layer (i.e., to beyond the depth of the applied dopant layer). In any case, one or more of the dopants may be externally applied to the parent metal surface and/or to the permeable preform. Additionally, dopants alloyed within the parent metal and/or externally applied to the preform and vice versa.

Useful dopants for an aluminum parent metal, particularly with air as the oxidant, include, for example, magnesium metal and zinc metal, in combination with each other or in combination with other dopants as described below. These metals, or a suitable source of the metals, may be alloyed into the aluminum-based parent metal at concentrations for each of between about 0.1–10% by weight based on the total weight of the resulting doped metal. Concentrations within this range appear to initiate the ceramic growth, enhance metal transport and favorably influence the growth morphology of the resulting oxidation reaction product.

Other dopants which are effective in promoting polycrystalline oxidation reaction growth for aluminum-based parent metal systems are, for example, silicon, germanium, tin and lead, especially when used in combination with magnesium or zinc. One or more of these other dopants, or a suitable source of them, is alloyed into the aluminum parent metal system as concentrations for each of from about 0.5 to about 15% by weight of the total alloy; however, more desirable growth kinetics and growth morphology are obtained with dopants concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying material to be added at a lower temperature.

One or more dopants may be used depending upon the circumstances, as explained above. For example, in the case of an aluminum parent metal and with air as the oxidant, particularly useful combinations or dopants include (a) magnesium and silicon or (b) zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials useful with an aluminum parent metal when air is employed as an oxidant, include sodium, lithium, calcium, boron, phosphorus and yttrium, which dopants may be used individually or in combination with one or more other dopants depending on the oxidant and process conditions. Sodium and lithium may be used in very small amounts in the parts per million range, typically about 100–200 parts per million, and each may be used alone or together, or in combination with other dopants(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables or improved local ceramic growth from the parent metal surface of portions thereof and lends itself to desired growth of the polycrystalline ceramic matrix into the permeable preform. Thus, growth of the polycrystalline ceramic matrix into the permeable preform can be favorably influenced by the localized placement of the dopant material upon the parent metal surface. The applied coating or layer of dopant is thin relative to the thickness of the parent metal body, and growth or formation of the oxidation reaction product into the permeable preform extends to substantially beyond the dopant layer, i.e., to beyond the depth for the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the present metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials, when used externally, are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram m of parent metal, or about 0.0001 gram of silicon per square centimeter of exposed parent metal surface, together with a second dopant providing a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than 0.0008 gram of dopant per gram of parent metal to be oxidized and greater than 0.003 gram of dopant per square centimeter of parent metal surface upon which the MgO is applied. It appears the to some degree an increase in the quantity to dopant materials will decrease the reaction time necessary to produce the ceramic composite, but this will depend upon such factors as type of dopant, the parent metal and the reaction conditions.

Where the parent metal is aluminum internally doped with magnesium and the oxidizing medium is air or oxygen, it has been observed that magnesium is at least partially oxidized out of the alloy at temperatures of from about 820 to 950° C. In such instances of magnesium-doped systems, the magnesium forms a magnesium oxide and/or magnesium aluminate spinel phase at the surface of the molten aluminum alloy, the during the growth process such magnesium compounds remain primarily at the initial oxide surface for the parent metal alloy (i.e., the "initiation surface") in the growing ceramic a structure. Thus, in such magnesium-doped system, an aluminum oxide-based structure is produced apart from the relatively thin layer of magnesium aluminate spinel at the initiation surface. Where desired, this initiation surface can be readily removed as by grinding, machining, polishing or grit blasting.

The invention is further illustrated by the following examples which are given by way of illustration only and are not intended to be limiting.

EXAMPLE 1

Figure 2A:
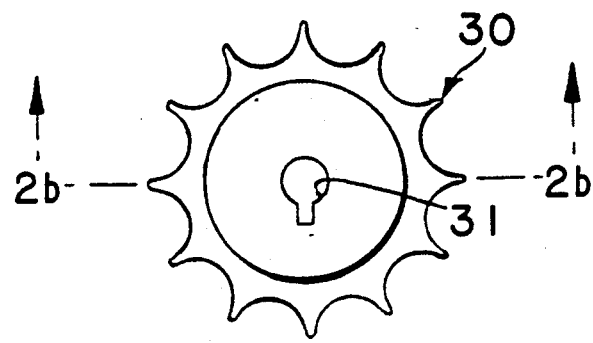
FIG. 2(a) is a plan view of a preform shaped as a sprocket for use in producing the composite according to the present invention.
Figure 2B:
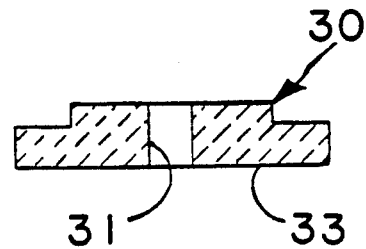
FIG. 2(b) is a cross-sectional view of the preform of FIG. 2 on line 2b-2b of FIG. 2(a).

Referring in detail to FIGS. 2–5, wherein the same reference numerals designate similar parts throughout, a ceramic sprocket 38 was fabricated from a preform 30 having the shape shown in FIGS. 2a and 2b. The preform measured 3 inches in outer diameter and 3/16 inch thick, and had a center key hole 31. The preform was prepared by a conventional method employing silicon carbide particles. A uniform mixture comprising 80 weight percent silicon carbide particles. A uniform mixture comprising 80 weight percent silicon carbide particles (an admixture of 70 weight % 500 grit and 30 weight % 220 grit) and 20 weight percent of an organic binder solution (in a 4 to 1 ratio of Elmer's wood glue to water) was poured into a silicon rubber mold, and then dried to set. The rigid sprocket shape 30 was then removed from the rubber mold.

Figure 3:
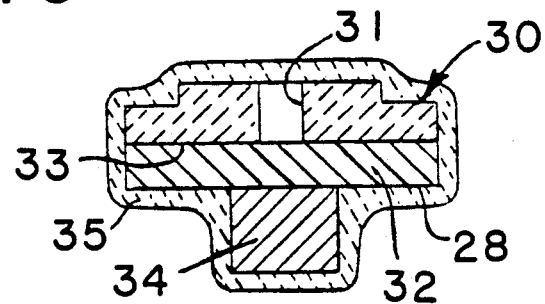
FIG. 3 is a cross-sectional view showing an assembly of the preform of FIG. 2(a) overlaying a parent metal.

A three-inch diameter of cylinder plate 32 of an aluminum alloy designated 380.1 (from Belmont Metals Inc., having a nominally identified composition by weight of 8–8.5% Si, 2–3% Zn and 0.1% Mg as active dopants, and 3.5% Cu as well as Fe, Mn, and Ni, but he Mg content was sometimes higher as in the range of 0.17–0.18% ), alloyed with an additional 6% lead, was placed in contact with preform surface 33. Ingot 34, of the same alloy 380.1 to provide sufficient quantity of alloy to enable complete infiltration of the preform, was placed in contact with surface 28 of plate 32. The combination of he cylindrical plate and ingot weighted 100 g. The system (preform 309 and alloys 32 and 34), set up as shown in FIG. 3, was coated on all exposed surfaces by an aqueous slurry of Plaster of Paris (Bondex containing about 35 weight percent calcium carbonate, from Bondex International, St. Louis, MO) to prevent overgrowth of the preform geometry by the ceramic matrix as described in the copending patent application U.S. Ser. No. 861,024, filed on May 8, 1986 (identified above) now U.S. Pat. No. 4,923,832. The Plaster of Paris coating 35 was allowed to set and the coated unit was completely submerged into a bed 36 of alumina particles (E1Alundum from Norton Company, 90 grit) contained in a refractory crucible 37, as shown in FIG. 4.

Figure 4:
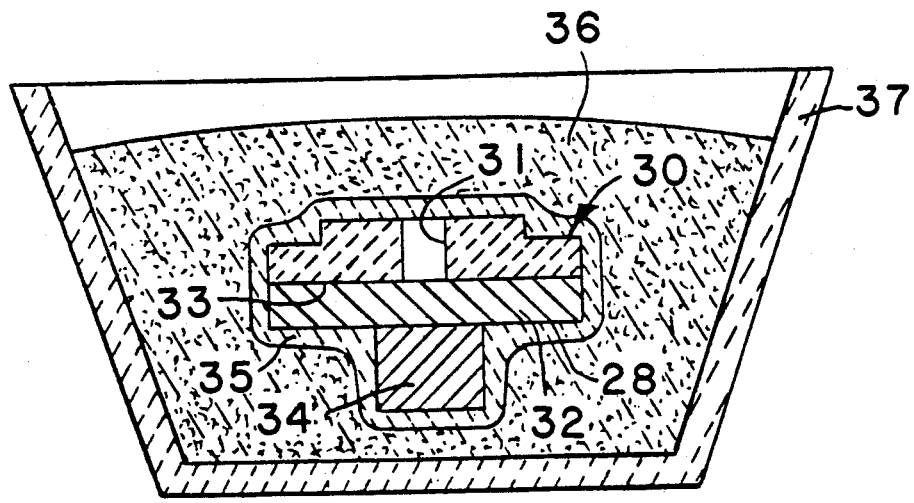
FIG. 4 is the assembly of FIG. 3 placed in an inert bed contained in a crucible.
Figure 5:
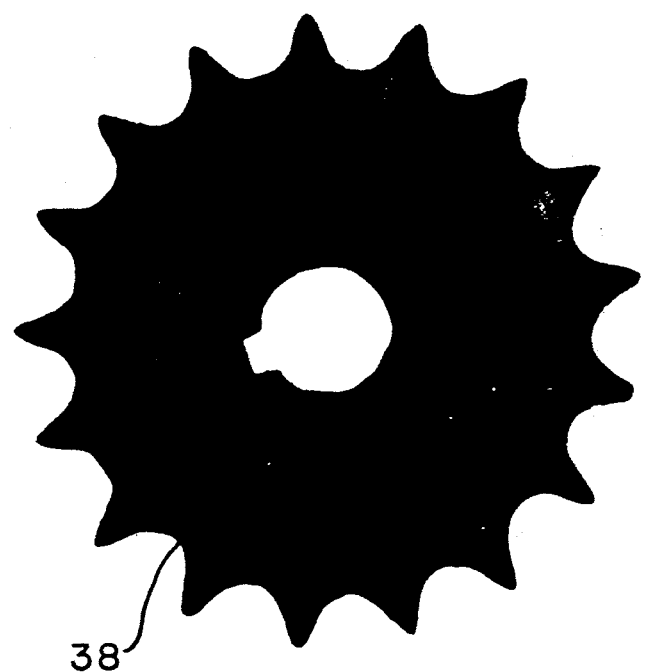
FIG. 5 is a photograph of the resulting composite.

The system as shown in FIG. 4 was heated in air from an initial temperature of 200° C. at a rate of 25 °C./hour to a final temperature of 1000° C. where it was held for 66 hours in air. The furnace was then cooled at the same rate and the sample was removed at approximately 600° C. The procedure resulted in a ceramic composite comprising an $\alpha$-alumina matrix (as evinced by X-ray powder diffraction analysis of the material) completely embedding the silicon carbide particles of the sprocket up to the plaster covered boundaries of the preform. The excess aluminum adhering to the face 33 of the sprocket, and the dehydrated plaster layer, were mechanically removed from the formed composite. The resulting ceramic sprocket 38 exhibited a high fidelity duplication of the preform, as shown in FIG. 5, and had an average Rockwell A hardness of 79.8.

EXAMPLE 2

Two preforms measuring 2¼ inches square and ¼-3/8 inch thick were prepared comprising 95% by weight alumina particles (E38 Alundum from Norton Co., 90 mesh size) and 5% by weight silicon dioxide. The preforms were shaped by, first admixing the and alumina with an organic binder (Avfecil PH-105 from FMC Co.), then pressing the composition into the specified geometry at 7900 psi, and finally preferring said preforms at 1375° C. for 24 hours. Each of the two preforms was placed on top of a bed of alumina particles (E38 Alundum, from Norton, 24 mesh size) contained by a refractory vessel. Two, 2 inch square by ½ inch thick, blocks of aluminum having different alloy composition were used as the parent metal, one of each being placed on top of each preform. The two alloys employed were 99% pure aluminum and 380.1 alloy (having the nominal compositin described in Example 1 without the additional 6% lead).

Figure 6A:
FIGS. 6(a) and (b) are photographs of cross-sectional pieces of composites made in accordance with Example 2.
Figure 6B:
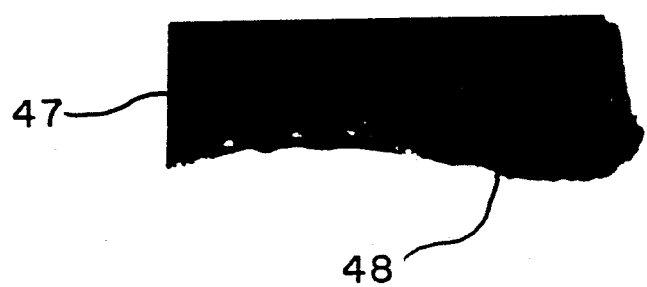

The above two system were heated to a set point temperature of 900° C. in air for 36 hours, a time sufficient for the $\alpha$-alumina ceramic matrix to completely infiltrate the preform to the opposite, defined boundary. Formation of an $\alpha$-alumina ceramic matrix was confirmed by X-ray powder diffraction analysis. FIGS. 6a and 6b show an elevational cross section of the ceramic products of the present Example. Upon examination of the body 45 produced from the 99% pure aluminum, and the body 47 produced from the 380.1 alloy, the $\alpha$-alumina ceramic matrix in each case was observed to have penetrated completely into the preform. The overgrowth of the preform boundaries by the ceramic matrix was limited to the face of the preform exposed to the alumina particle bedding, and varied in degree between the two systems. The sample which employed the 99% pure aluminum precursor showed negligible overgrowth of the preform boundary by the ceramic matrix into the filler bed, which could be easily removed by light machining or grinding. FIG. 6a is illustrative of the very limited overgrowth 46 of this ceramic composite 45. Since the ceramic matrix resulting from the oxidation of the 380.1 alloy apparently required less time to penetrate the preform, for the same reaction time, the ceramic composite 47 had substantial overgrowth 48. Hence, fidelity can be achieved by controlling the reaction so as not to allow growth of the ceramic matrix beyond the defined preform boundary.

EXAMPLE 3

Figure 7A:
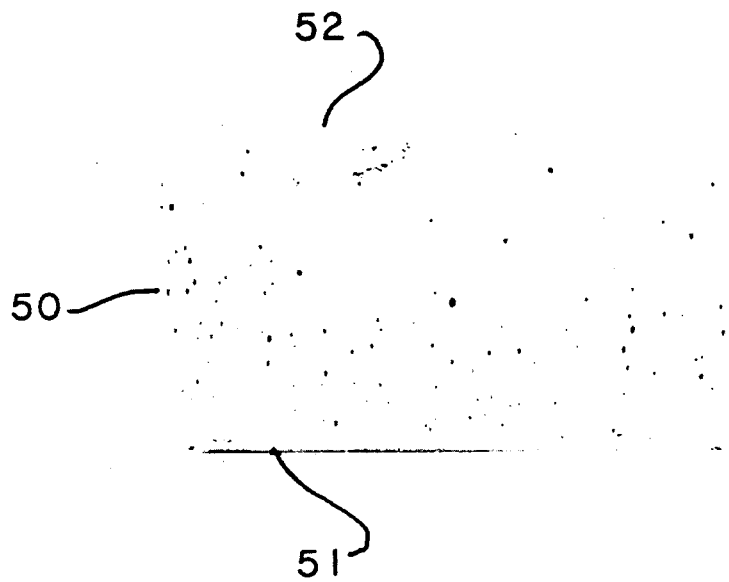
FIGS. 7(a) and (b) are elevational and plan photographs of a preform used in producing the composite of Example 3.
Figure 7B:
FIG. 7(c) is a photograph of the composite made in accordance with Example 3.

Referring to FIGs. 7a, 7b, and c, a preform 50 having a trapaxoidal shape in elevation (1¾ inches thick and having a rectangular face 51 measuring 8 7/16 inches×2¼ inches and rectangular face 52 measuring 8 5/8 inches by 2¾ inches) was cast, by a conventional method, form a mixture comprising 32 weight percent alumina particles (E67 Alundum, from Norton Co., 1000 mesh size), 35 weight percent silicon dioxide (500 mesh size), 0.5 weight percent silicon, 0.56 weight percent sodium silicate (introduced as a predissolved solution the water used to slurry the preform mixture as described below) and 32 weight percent Greencast 94 binder (from A. P. Green Refractories Co., Mexico MO, 100 mesh size and finer). The above mixture was slurried in water (containing the above specified amount of dissolved sodium silicate) and poured into a mold having the described geometry. The mixture was allowed to air dry and was removed from the mold as a rigid trapazoidal body 50. The word "oxide" was inscribed on face 52 of the preform (see FIG. 7b), and the preform was fired in air at 1000° C. for 1 hour.

Two bars of commercially available 5052 alloy (having a nominal composition by weight of 2.5% Mg and approximately 1% combined total of other species such as Fe, Cr, Si, and Cu), and one bar of 99% pure aluminum, each measuring 8½ inches long by 2½ inches wide by ½ inch thicken, were stacked such that the pure aluminum bar was between the two 5052 bars; and the stack was placed on top of a thin layer of silicon carbide particles (24mesh size) contained in a refractory vessel. The trapazoidal preform was placed on top of the stack of aluminum bars such that face 51 of the preform was entirely in contact with the top 8½ inch by 2½ inch rectangular face of the stack of aluminum alloy bars, and thus the entire weight of the preform was supported by the metal stack. The crucible was then filled with silicon carbide particles (14 mesh size) as to completely cover the aluminum metal but allowing the five surfaces of the preform, not in contact with the aluminum metal, to remain substantially exposed to the atmosphere.

The above system was placed in a furnace (which was vented to the flow of air) and heated up over a 5 hour period to a reaction temperature of 1000° C. The furnace was maintained at that reaction temperature for 144 hours. The furnace was cooled to ambient and reheated to 1000° C. for 6 additional hours to completely infiltrate the preform.

Figure 7C:

The molten aluminum metal reacted with the oxidants (vapor phase oxidant and solid oxidants such as silica) forming an α-alumina ceramic matrix which infiltrated the preform thus embedding the particles of the preform composition. Formation of the ceramic matrix continued completely to the surface boundaries of the preform and was substantially contained within those defined boundaries. Examination of the composite product 53 showed high fidelity compared to the preform as evidence by the clear imprint (see FIG. 7c), with only negligible overgrowth by the ceramic matrix.

The foregoing is illustrative of the embodiment of the present invention wherein the composition of the preform enhances the oxidation of the molten parent metal preferentially within the preform boundaries. Such preferential oxidation helps to control overgrowth of the preform boundaries by the ceramic matrix. The body 53 thus obtained is a shaped ceramic article maintaining the geometry of the trapazoidal preform 50.

What is claimed is:

1. A method for producing a ceramic composite body of a desired shape comprising a preform infiltrated by a ceramic matrix obtained by oxidation of a parent metal to form a polycrystalline material comprising an oxidation reaction product of said parent metal with at least one oxidant, said method comprising the steps of: (a) heating said parent metal to a temperature above its melting point but below the melting point of the oxidation reaction product to form a body of molten metal; (b) contacting a zone of a permeable preform with said body of molten metal, said permeable preform being a shaped body of filler material which is capable of supporting its own weight and maintaining dimensional fidelity without any means of support located external to any surface of said preform, and said preform having at least one defined surface boundary spaced from said contacting zone such that formation of said oxidation reaction product will occur into said preform and in a direction toward said defined surface boundary; (c) reacting said molten metal at said temperature with said oxidant to form said oxidation reaction product; (d) maintaining at least a portion of said oxidation reaction product in contact with and between said molten metal and said oxidant, to progressively draw molten metal through the oxidation reaction product towards the oxidant so that fresh oxidation reaction product continues to form at an interface between said oxidant and previously formed oxidation reaction product that has infiltrated the preform; and (e) continuing said reacting until said oxidation reaction product has infiltrated said preform to said defined surface boundary to produce said ceramic composite body having a configuration of said preform.

2. A method for producing a ceramic composite body of desired shape comprising a preform infiltrated by a ceramic matrix obtained by oxidation of an aluminum parent metal to form a polycrystalline material comprising alumina as an oxidation reaction product of said aluminum parent metal with an oxygen-containing gas as oxidant, said method comprising the steps of: (a) providing a preform, said preform being a shaped body of filler material which is capable of supporting its own weight and maintaining dimensional fidelity without any means of support located external to any surface of said preform, said preform having at least one defined surface boundary and being self-supporting and permeable to said oxidant and to infiltration by the growth of the oxidation reaction product; (b) alloying a suitable dopant into said aluminum parent metal, or applying a suitable dopant to a surface of said aluminum parent metal, or incorporating a suitable dopant within said preform, or any combination thereof; (c) heating said aluminum parent metal to a temperature between about 850° C. and 1450° C. to form a body of molten metal, and counting said permeable preform at a zone spaced from said defined surface boundary with said body of molten metal such that formation of said oxidation reaction product will occur into said preform and in a direction towards said defined surface boundary; (d) reacting said molten metal at said temperature with said oxidant to form alumina as said oxidation reaction product; (e) maintaining at least a portion of said oxidation reaction product in contact with and between said molten metal and said oxidant, to progressively draw molten metal through the oxidation reaction product towards the oxidant so that fresh oxidation reaction product continues to format an interface between said oxidant and previously formed oxidation reaction product that has infiltrated the preform; and (f) continuing said reacting until said oxidation reaction product has infiltrated said preform to said defined surface boundary to produce said ceramic composite body having a configuration of said preform.

3. The method of claim 1, wherein said parent metal comprises aluminum.

4. The method of claim 1, further comprising at least one additional oxidant selected from the group consisting of a solid oxidant and a liquid oxidant, said at least one additional oxidant being incorporated into at least a portion of said preform, and causing said molten metal to react with said at least one additional oxidant resulting in said polycrystalline material further comprising an oxidation reaction product of said parent metal with said at least one additional oxidant.

5. The method of claim 4, wherein said solid oxidant comprises at least one material selected from the group consisting of silica, boron, and reducible borides.

6. The method of claim 1, wherein said oxidant comprises at least one of an oxygen-containing gas and a nitrogen-containing gas.

7. The method of claim 1, wherein said parent metal comprises an element selected from the group consisting of silicon, titanium, tin, zirconium and hafnium.

8. The method of claim 1, wherein said oxidant comprises at least one material selected from the group consisting of an oxygen-containing gas, a nitrogen-containing gas, a halogen, sulphur, phosphorus, arsenic, carbon, boron, selenium and tellurium.

9. The method of claim 8, wherein said oxidant comprises air.

10. The method of claim 8, wherein said oxidant comprises an $H_2/H_2O$ mixture or a $CO/CO_2$ mixture.

11. The method of claim 8, wherein said oxidant comprises forming gas.

12. The method of claim 1, wherein said preform comprises at least one material selected from the group consisting of hollow bodies, particulates, fibers, whiskers, spheres, plates, aggregate, rods, bars, and platelets.

13. The method of claim 1, wherein said preform comprises at least one material selected from the group consisting of single metal oxides of a metal selected from the group consisting of aluminum, cerium, hafnium, lanthanum, neodymium, praseodymium, samarium, scandium, thorium, uranium, yttrium and zirconium.

14. The method of claim 1, wherein said preform comprises at least one material selected from the group consisting of alumina, silicon carbide, silicon aluminum oxynitride, magnesium aluminate, ferrous alloys, and aluminum.

15. The method of claim 1, wherein said preform comprises at least one material selected from the group consisting of silica, silicon carbide, and alumina.

16. The method of claim 15, wherein said filler material comprising said preform have a particle size of from about 10 mesh to about 1000 mesh.

17. The method of claim 1, wherein said preform comprises coated carbon fiber.

18. The method of claim 3, wherein said oxidant comprises an oxygen-containing gas and said temperature is from about 900° C. to about 1350° C.

19. The method according to claim 1, further comprising the step of establishing within the preform oxidation kinetics of the parent metal more favorable than outside the preform thereby preferentially causing development of said matrix within said preform and minimizing overgrowth of said matrix beyond the boundaries of said preform.

20. The method according to claim 1, further comprising using at least one suitable dopant material in conjunction with said parent metal.

21. The method of claim 20, wherein at least one dopant material is alloyed into the parent metal.

22. The method of claim 21, wherein at least one dopant material is applied as a layer onto a surface of said parent metal, and further comprising forming the oxidation reaction product to substantially beyond the depth of the applied layer of dopant material.

23. The method of claim 21, further comprising providing at least one dopant material at least partially within said preform.

24. The method of claim 21, wherein said dopant comprises a source of at least two of magnesium, zinc, silicon, germanium, tin, lead, boron, sodium, lithium, calcium, phosphorous, yttrium, and a rare earth metal, and compounds thereof.

25. The method of claim 24, wherein said rare earth metal comprises at least one element selected from the group consisting of lanthanum, cerium, praseodymium, neodymium and samarium.

26. The method of claim 24, wherein said polycrystalline material further comprises an initiation surface of a spinel formed as an oxidation reaction product of said parent metal, said dopant and said oxidant.

27. The method of claim 26, wherein said dopant comprises magnesium or a source of magnesium, said parent metal comprises aluminum, and said oxidant comprises an oxygen-containing gas.

28. The method of claim 1 wherein said preform comprises at least one material selected from the group consisting of powders, bubbles, metal wool, wires, wire cloth, pellets, tubes, and refractory fiber cloth.

29. The method of claim 1, wherein said vapor-phase oxidant comprises at least one material selected from the group consisting of an $H_2/H_2O$ mixture, air, methane, ethane, propane, acetylene, ethylene, propylene, and a $CO/CO_2$ mixture.

30. The method of claim 20, wherein at least one dopant material is applied as a layer onto a surface of said parent metal, and further comprising forming the oxidation reaction product to substantially beyond the depth of the applied layer of dopant material.

31. The method of claim 20, further comprising providing at least one dopant material at least partially within said preform.

32. The method of claim 20, wherein said dopant comprises a source of at least two of magnesium, zinc, silicon, germanium, tin, lead, boron, sodium, lithium, calcium, phosphorus, yttrium, and a rare earth metal, and compounds thereof.

33. A method for producing a unified and integral ceramic composite body of desired shape comprising an assemblage of at least one permeable preform infiltrated by a ceramic matrix, said at least one permeable preform being a shaped body of filler material which is capable of supporting its own weight and maintaining dimensional fidelity without any means of support located external to any surface of said preform, and said ceramic matrix being obtained by oxidation of a parent metal to form a polycrystalline material comprising an oxidation reaction product of said parent metal with at least one oxidant including a vapor-phase oxidant, said method comprising the steps of:

(a) heating said parent metal to a temperature above its melting point but below the melting point of the oxidation reaction product to form a body of molten metal;

(b) contacting a zone of said assemblage with said body of molten metal such that formation of said oxidation reaction product will occur into said assemblage;

(c) reacting said molten metal at said temperature with said oxidant to form said oxidation reaction product;

(d) maintaining at least a portion of said oxidation reaction product in contact with and between said molten metal and said oxidant, to progressively draw molten metal through the oxidation reaction product towards the oxidant so that fresh oxidation reaction product continues to form at an interface between said oxidant and previously formed oxidation reaction product that has infiltrated said assemblage; and (e) continuing said reacting until said oxidation reaction product has completely infiltrated said assemblage to produce said ceramic composite body having a configuration of said assemblage.

* * * * *